United States Patent [19]
Geldman et al.

[11] Patent Number: 5,524,268
[45] Date of Patent: Jun. 4, 1996

[54] FLEXIBLE PROCESSOR-DRIVEN CONTROL OF SCSI BUSES UTILIZING TAGS APPENDED TO DATA BYTES TO DETERMINE SCSI-PROTOCOL PHASES

[75] Inventors: John S. Geldman, Los Gatos; Joe Y. Chen; Tony J. Yoon, both of San José, all of Calif.

[73] Assignee: Cirrus Logic, Inc., Fremont, Calif.

[21] Appl. No.: 904,807

[22] Filed: Jun. 26, 1992

[51] Int. Cl.$^6$ .............................. G06F 9/00; G06F 13/00; G06F 13/10; G06F 13/12
[52] U.S. Cl. .................. 395/825; 395/872; 395/882; 364/DIG. 1; 364/238.3; 364/239; 364/239.9; 364/240.5; 364/DIG. 2; 364/926.93
[58] Field of Search ............................ 395/225, 872, 395/884, 825, 309; 360/77.05

[56] References Cited

U.S. PATENT DOCUMENTS

| | | | |
|---|---|---|---|
| 4,783,705 | 11/1988 | Moon et al. | 360/77.08 |
| 4,965,801 | 10/1990 | Dulac | 371/40.1 |
| 5,239,636 | 8/1993 | Dujari et al. | 395/425 |
| 5,276,807 | 1/1994 | Kodama et al. | 395/200 |

OTHER PUBLICATIONS

Bursky, D., "Intelligent Controller Trims SCSI Overheads", *Electronic Design*, Aug. 10, 1989 pp. 37–40.
Bursky, D., "SCSI Controller Moves Synchronous Data at 10 Mbytes/s", *Electronic Design* Apr. 12, 1990, pp. 195, 196, 198.
Bursky, D. "Enhanced SCSI Processor Pushes System Performance", *Electronic Design*, Sep. 13, 1990, pp. 101, 102.
NCR 53C700 Data Manual, Feb. 1990.
NCR 53C700 Programmer's Guide, Feb. 1990.

*Primary Examiner*—Thomas C. Lee
*Assistant Examiner*—D. Dinh
*Attorney, Agent, or Firm*—Blakely, Sokoloff, Taylor & Zafman

[57] ABSTRACT

The invented controller is the combination of: an intelligent interface to a SCSI bus, a multi-part buffer memory manager, a formatter, and a local processor port. With the addition of a few components for the device-level interface, the invented controller along with a buffer RAM, a local processor system, and an optional data separator completes a high performance disk, or other mass storage, controller subsystem. The invention is particularly directed to (1) the dual use of a buffer memory as data buffer storage and for storage of instructions to be executed by a SCSI-protocol processor, (2) the architecture of the interface to the SCSI bus, and (3) the instruction set of the SCSI-protocol processor.

4 Claims, 2 Drawing Sheets

FLEXIBLE PROCESSOR-DRIVEN CONTROL OF SCSI BUSES UTILIZING TAGS APPENDED TO DATA BYTES TO DETERMINE SCSI-PROTOCOL PHASES

FIELD OF THE INVENTION

This invention relates generally to digital computer systems particularly to disk drive controllers. More particularly the invention relates to disk drive controllers which utilize a standard know as SCSI (Small Computer System Interface) and a newer standard known as SCSI-2.

SUMMARY OF THE INVENTION

The invented controller is the combination of: an intelligent interface to a SCSI bus, a multi-port buffer memory manager, a formatter, and a local processor port. With the addition of a few components for the device-level interface, the invented controller along with a buffer RAM, a local processor system, and an optional data separator completes a high performance disk, or other mass storage, controller subsystem. The invention is particularly directed to (1) the dual use of a buffer memory as data buffer storage and for storage of instructions to be executed by a SCSI-protocol processor, (2) the architecture of the interface to the SCSI bus, and (3) the instruction set of the SCSI-protocol processor.

It is an object of the invention to create a flexible SCSI disk controller that can execute basic SCSI instructions within hardware while allowing more complex instructions to be created in firmware (or software).

It is an object of the invention to maximize command transfer rates between the host and the SCSI-protocol controller (the invention).

It is an object of the invention to relieve the local hard disk micro-controller of the tasks of performing SCSI instruction processing.

It is an object of the invention to automatically support multiple hosts and drivers operating with different data rates and various SCSI protocols.

A still further object is to design an SCSI-protocol processor that efficiently functions despite large arbitration latencies between the buffer memory and the SCSI/disk controller.

Another object of the invention is to support Queue Tag message protocol and SCSI Transfer Parameter message negotiations in order to increase the SCSI transaction throughput.

BRIEF DESCRIPTIONS OF THE DRAWINGS

DETAILED DESCRIPTION OF THE INVENTION

Figure 1:
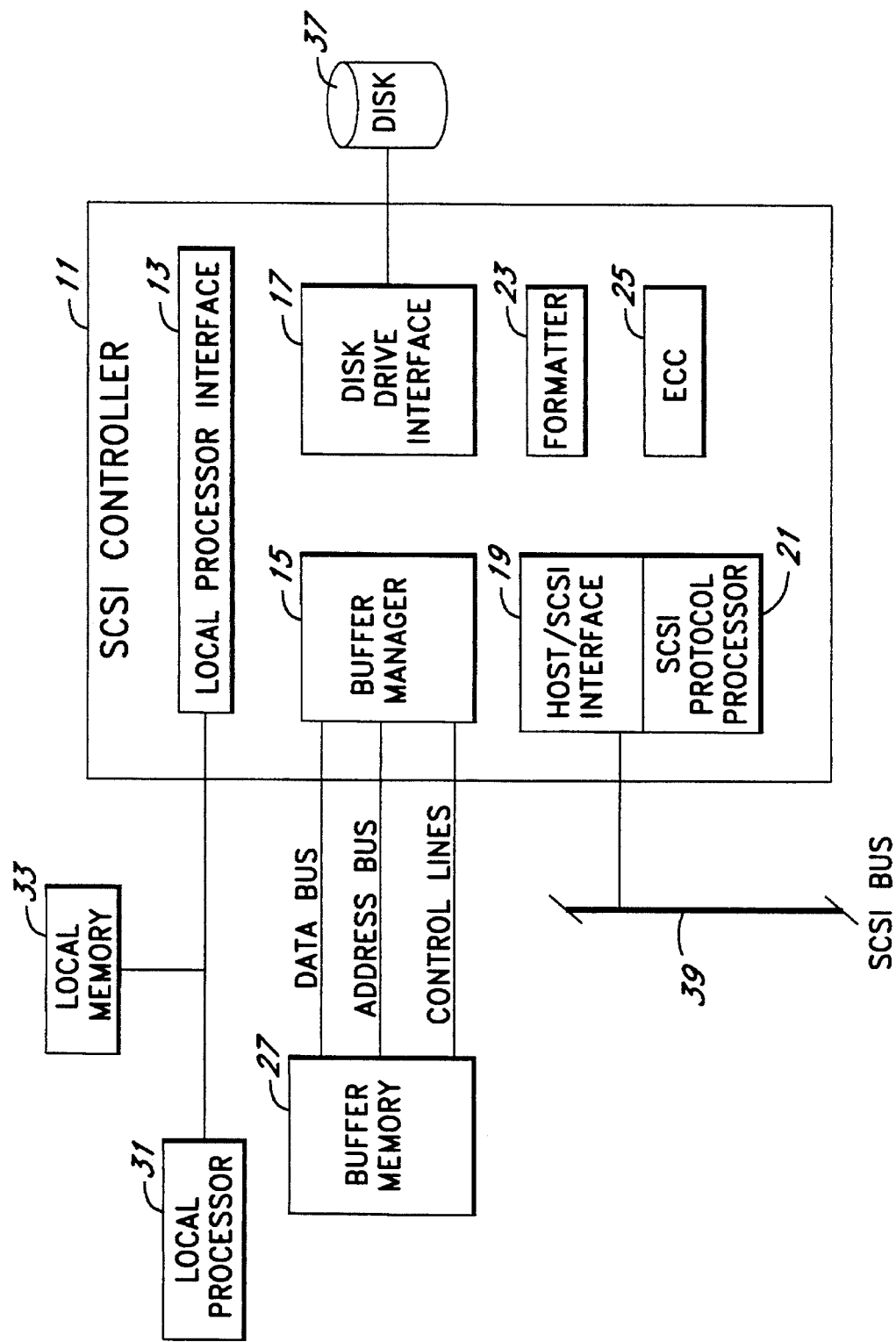
FIG. 1 is a block level diagram of the invented controller in relationship to other elements of a disk drive controller system.

As shown in FIG. 1, the invented controller 11 comprises a local processor interface 13, buffer manager 15, disk drive interface 17, Host/SCSI interface 19, SCSI-protocol processor 21, formatter 23, and error correction circuitry (ECC) 25. The buffer manager is coupled to a buffer memory 27. The local processor interface is coupled to local processor 31 and local memory 33 which stores the instructions to be executed by the local processor 31. Disk drive interface 17 is coupled to disk drive 37. Host/SCSI interface 19 is coupled to SCSI bus 39 which, although not shown in FIG. 1, is coupled to the host computer through the host's SCSI interface. Excepting for the data, address and control buses between buffer manager 15 and buffer memory 27, also not shown in FIG. 1 are the various control lines and buses between the various components. However, the details of such couplings would be design choices which would be readily determinable by persons skilled in the field of the invention based upon the descriptions contained herein.

Formatter 23, ECC 25, disk drive interface 17 and disk drive 37 are shown for completeness, but such elements do not form part of the invented system and, therefore, will not be described herein.

Overview Description of Elements

LOCAL PROCESSOR OVERVIEW

Local processor 31 provides the invented controller with initial operating parameters that may include disk sector format, the type and size of buffer memory, and SCSI configuration. During SCSI-protocol negotiations and data transfer operations, the invented controller requires only minimal intervention from the local processor.

The processor to controller communication path can interface to commercially available microprocessors such as the Intel 80C196 class of controllers or the Motorola MC680x0 series.

The invented controller has centralized status registers with programmable interrupt mask and steering capabilities. These features allow firmware developers flexibility for writing either polled loops, interrupt handlers or control threads to provide the real-time process control critical in embedded controller drive applications.

SCSI INTERFACE OVERVIEW

SCSI/host interface 19 is designed for compliance with the proposed SCSI-2 specification. A single-cable sixteen-bit SCSI configuration is also supported. This includes sixteen-bit transfer in the data phase, sixteen-bit arbitration and sixteen-bit selection phases.

The SCSI interface logic includes integrated high current drivers for the single-ended option as well as signals to control external logic necessary to implement a SCSI system with differential transceivers.

Asynchronous, synchronous and fast synchronous SCSI transfer handshake protocols are supported in both Initiator and Target modes.

The SCSI protocol overhead is controlled by the embedded SCSI-protocol processor 21. The SCSI-protocol processor program and data are stored in the buffer RAM 27. The user can define both the sequences and the automation levels that will be supported. This implementation of the SCSI interface helps simplify the local processor's SCSI protocol firmware and reduces the overall time required for SCSI transactions.

BUFFER MANAGER OVERVIEW

Buffer manager 15 controls the flow of data to and from the buffer memory 27. The buffer manager provides support for automated streaming (data flow control) of data between disk drive interface 17 and SCSI/host interface 19, or for treating these interfaces independently (as in queued command processing). The buffer manager schedules (using time interleaved access cycles) buffer access requests from each of the independent direct memory access (DMA) channels, including: SCSI data path, disk data path, local processor buffer access, SCSI-protocol processor instruction access, DRAM Refresh, and any other required channel.

The buffer manager provides for several types of disk/SCSI streaming operations, with controlled minimum and maximum burst lengths. These streaming operations can use a variable-size circular buffer or variable-size non-consecutive segments (as is convenient for least recently used caching).

The physical buffer memory 27 may be implemented with static or dynamic RAM devices. The buffer manager provides all of the necessary address and control signals for RAM devices and for 8-bit data paths or 16-bit data paths. Up to 512 kilobytes of SRAM or up to 8 megabytes of DRAM can be directly addressed by the invented controller.

The local processor 31 can read or write to the scheduled access port, which uses a Local Address Pointer for the buffer memory address. Each access can be configured to increment the Local Address Pointer.

The buffer manager can also perform memory-to-memory block copy and compare operations. The block copy operation is convenient for de-fragmenting cached memory or for manipulating SCSI blocks. The block compare operation is convenient for implementing the SCSI compare record command as well as for implementing buffer memory self-tests.

Local processor interface 13 supports commercially available local processor interfaces—examples include: 16 Mhz 8051, 12 Mhz 68HC11, 20 Mhz 80C196, 40 Mhz HPC460X3, 16.67 Mhz MC680x0. It provides a Protected Area in buffer memory 27 for local processor storage. It supports flexible host and disk interrupt structures for interrupt or polled firmware architectures. It supports a local processor controlled power down mode with automatic wake-up capability.

Host/SCSI interface 19 supports SCSI-2, SCSI-1, and SASI (the precursor to SCSI, Shugart Associates System Interface) Target and Initiator modes. It supports both Eight and Sixteen-bit SCSI bus widths. It supports sixteen bit-bit arbitration and selection.

The Buffer RAM based SCSI-protocol processor 21 allows the firmware developer to define the automated sequences as well as the automation level of these sequences. It can be programmed to optimize SCSI overhead processing, or can be programmed to work with minimal changes to existing local processor algorithms.

The SCSI-protocol processor 21, has self-contained debugging circuitry including breakpoint and single step control. It is integrated with buffer manager 15 for Disk/SCSI streaming (data flow control). It supports through parity between the SCSI bus and the buffer memory 27. It supports asynchronous transfers up to 4 megabytes/ second (or 8 MB/second with sixteen data bits), synchronous transfers up to 5 MB/ second (10 MB/second transfer with sixteen data bits), SCSI-2 FAST synchronous transfers up to 10 MB/second (20 MB/second transfer with sixteen data bits). It supports up to 62 byte synchronous SCSI offsets (to support the FAST sixteen-bit data bus environment).

Buffer manager 15 includes programmable for eight or sixteen data bus lines, and independent, automatically arbitrated DMA channels, including: host data path, disk data path, processor accesses, SCSI-protocol processor instruction accesses, DRAM Refresh. It supports direct addressing up to 512 kilobytes of SRAM or 8 MB of DRAM, and permits concurrent buffer throughput up to 30 MB/second in DRAM mode and up to 30 MB/second in SRAM mode. It supports automated host/disk streaming capability with Over/Under Run protection and minimum burst length support. It supports variable-sized circular buffer and variable-sized segment based caching support. It has a automatic address pointer reload capability for the host pointer, which allows fragmented buffers to be linked for un-interrupted transfers. It has a memory to memory block copy feature, which aids in SCSI response block building and to un-fragment cached data, and a memory to memory block compare feature, provides self-test and SCSI record compare features.

Theory Of Operation

LOCAL PROCESSOR INTERFACE 13

In the following description, the abbreviated terms have the following meanings:

| | |
|---|---|
| ALE | address latch enable |
| AD | address/data bus |
| ADR | address bus |
| AS* | address strobe (asserted low) |
| RD* | memory read (asserted low) |
| WR* | memory write (asserted low) |
| R_W* | read not write (read operation when low, write when high) |
| WCS | writable control store |
| BA | buffer address |

The local processor to controller communication path can be either a multiplexed address and data bus or a non-multiplexed address and data bus. The multiplexed bus is similar to that provided by the Intel 80C196 or the Motorola 68HC11, class of controllers. The non-multiplexed bus is similar to that provided by the Motorola 680x0 series of processors.

LOCAL PROCESSOR TO BUFFER MANAGER INTERFACE

Local processor 31 can read or write the contents of the data buffer RAM 27 by means of a scheduled buffer memory access using the invented controller's BUFFER DATA ACCESS PORT. By reading or writing this port, the local processor generates an arbitrated buffer cycle request to the buffer manager 27, which is allocated asynchronously to the local processor (regardless of whether it is a read or write memory access). The LOCAL ADDRESS POINTER is used as the pointer into the buffer memory for these accesses.

The invented controller will attempt to hold the local processor (using the RDY/DTACK* signal) until the access is complete. If the local processor ignores, or is not connected to the RDY/DTACK* signal, the scheduled access will continue and the Buffer Access Byte Ready bit of the PROCESSOR ACCESS CONFIGURATION Register should be polled to determine when access has been completed. In order to write a byte to the buffer memory, the local processor loads the invented controller's BUFFER DATA ACCESS PORT with the data to be written to the buffer memory 27. This generates a transfer request to the buffer manager which will grant a prioritized buffer memory access cycle. This request writes to the address pointed to by the Local Address Pointer. When the byte has been successfully written, the BUFFER ACCESS BYTE READY bit of the PROCESSOR ACCESS CONFIGURATION Register will be set, and the RDY/DTACK* signal will be asserted. If the local processor ignores the RDY/DTACK* signal, then the scheduled access will continue, and the RDY/DTACK* signal will switch to high-impedance after the trailing edge of the write strobe. The invented controller can be configured for automatic incrementing after each access.

Reading a byte from the buffer memory 27 is initiated by having the local processor read the BUFFER DATA ACCESS PORT. This generates a transfer request to the buffer manager 15 which will grant a prioritized buffer memory access cycle. This request fetches the byte located at the address pointed to by the LOCAL ADDRESS POINTER. When the byte has been successfully read, the BUFFER ACCESS BYTE READY bit of the PROCESSOR ACCESS CONFIGURATION Register will be set, and the RDY/DTACK* signal will be asserted.

If the local processor ignores the RDY/DTACK* signal, then the scheduled access will continue, and the RDY/DTACK* signal will switch to high-impedance after the trailing edge of the read strobe. The first byte returned in this case does not contain valid data and should be discarded. When the Buffer Access Byte Ready bit becomes true (the bit is set), then the byte pointed to by the Local Address Pointer has been stored in the BUFFER DATA ACCESS PORT. When this port is read again by the local processor, this read cycle returns the first byte and causes an additional automatic request for another buffer memory access. If the invented controller is configured for automatic incrementing after each access, then this request fetches the byte located at the following address.

SCSI Interface

The invented controller's SCSI interface contains a SCSI-protocol processor 21 which manages SCSI phase changes, SCSI message protocols, and controls data transfer across SCSI bus 39. The SCSI-protocol processor's operation is either controlled by a program stored in buffer memory 27, or by the local processor (which issues immediate SCSI-protocol processor instructions).

The following description of SCSI-protocol processor operation covers the overall operation of the SCSI-protocol processor 21 as well as the major components and the data path of the SCSI-protocol processor.
SCSI-PROTOCOL PROCESSOR OPERATION The sequences of the SCSI bus phase transition and any process can be programmed into the invented controller's SCSI-protocol processor 21. The invented controller's SCSI interface 19 contains a built-in processor 21 that executes an instruction issued from the local processor or executes a program from the buffer memory (without intervention from the local processor). These capabilities provide faster bus handling, less local processor overhead, with lower firmware development costs.
SCSI-PROTOCOL PROCESSOR INSTRUCTION EXECUTION MODES The invented controller's SCSI-protocol processor has three instruction execution modes: Immediate Execution Mode, Single Step Execution Mode, and Program Execution Mode. The processing of most SCSI connections will utilize the Program and Immediate instruction execution modes. The Single Step Execution Mode is provided to support any required debugging of SCSI-protocol processor programs.
IMMEDIATE EXECUTION MODE In the Immediate Execution mode, the SCSI-protocol processor executes one instruction (loaded by the local processor). This mode can only be used when the SCSI-protocol processor is not executing instructions in the Single Step or Program Execution Modes.

In order to use this mode, the local processor loads the SCSI INSTRUCTION REGISTER with a valid instruction, and then sets the Start SCSI-protocol processor Immediate Execution bit of the SCSI PROCESSOR CONTROL Register. Upon completion of the instruction, or if unexpected situations occur, the SCSI process, or will reset the Start SCSI processor Immediate Execution bit. Depending on status, the SCSI processor Interrupt bit of the SCSI INTERRUPT STATUS Register or appropriate status bit will be set and a local processor interrupt may be requested. The local processor 31 can stop the SCSI-protocol processor's operation by setting the Stop SCSI processor bit of the SCSI PROCESSOR CONTROL Register which will also reset the Start SCSI processor Immediate Execution Bit.
SINGLE STEP EXECUTION MODE In the Single Step Execution Mode, the SCSI-protocol processor 21 will execute one instruction pointed to by the SCSI INSTRUCTION ADDRESS Register. This will include any necessary instruction or data fetches, and the calculation of the next address.

To execute a program step, the local processor 31 loads the buffer memory 27 with the desired program, then loads the SCSI INSTRUCTION ADDRESS Register with the starting address of the program, and then sets the Start Single Step Execution bit of the SCSI PROCESSOR CONTROL Register. Upon completion of the instruction, or if unexpected situations occur, the SCSI processor will reset the Start SCSI processor single step execution bit. Depending on status, the SCSI processor interrupt bit of the SCSI INTERRUPT STATUS Register or appropriate status bit will be set and a local processor interrupt may be requested.

The local processor can stop the SCSI-protocol processor's operation by setting the Stop SCSI processor bit of the SCSI PROCESSOR CONTROL Register, and this will also reset the Start SCSI processor single step execution bit.
PROGRAM EXECUTION MODE In the Program Execution Mode, the SCSI-protocol processor 21 executes the instructions from the buffer memory until unexpected situations occur, the SCSI-protocol processor 21 executes the Halt instruction, or the SCSI INSTRUCTION ADDRESS Register reaches the SCSI BREAKPOINT ADDRESS (and the STOP SCSI PROCESSOR ON BREAKPOINT bit is set).

To execute a program sequence, the local processor loads the buffer memory with the desired program, then loads the SCSI INSTRUCTION ADDRESS Register with the starting address of the program, and then sets the START SCSI PROCESSOR PROGRAM EXECUTION bit of the SCSI PROCESSOR CONTROL Register. Upon executing the Halt instruction, the START SCSI PROCESSOR PROGRAM EXECUTION bit of the SCSI PROCESSOR CONTROL Register will be reset. The local processor can stop the SCSI processor's operation by setting the STOP SCSI PROCESSOR bit of the SCSI PROCESSOR CONTROL Register which will also reset the START SCSI PROCESSOR PROGRAM EXECUTION bit.

SCSI-Protocol Processor Instruction Set

The SCSI-protocol processor instructions can be organized into ten basic categories: a Set and Clear Group; a Compare Group; a Jump and Interrupt Group; a Transfer Group; a Disconnect Group; a Miscellaneous Group; and the following four categories.

These categories of instructions (BANK/BUFFER TRANSFER, SAP MANIPULATION, REGISTER BANK ACCESS, and NUMERIC FUNCTIONALITY) are intended to allow the SCSI-protocol processor to support the Queue Tag message protocol. The Queue Tag is a SCSI message that is analogous to a job batch number. The Queue Tag allows the invention to simply communicate with the host or other external devices regarding the tagged process. SCSI also requires negotiation for several transfer parameters (data-width, synchronous transfer period, and synchronous offset). These categories of instructions are intended to efficiently access lists or tables to support Queue Tag messages and SCSI transfer parameter negotiations.

BANK/BUFFER TRANSFER

Six eight-bit registers, R0 through R5, allow the SCSI processor to access buffer memory 27 in an efficient method which minimizes the effects of the access latency of a time multiplexed buffer. These instructions access the buffer memory starting at the address in the referenced SAP (SCSI Address Pointer) register, accessing COUNT bytes of data, where the first byte of the access always uses R0. These instructions make use of a buffer memory burst access to improve total access time.

| Format: | OP Code (1 byte) + Operand (1 byte) |
|---|---|
| LDRX | AP, COUNT |
| WRRX | AP, COUNT |
| | AP is either SAP1 or SAP2 |
| | COUNT is an 8-bit integer from 1 to 6 |

LDRX: This instruction loads sequential buffer memory data in the Rx registers based on the eight-bit integer COUNT. R0 is always the first Rx register loaded from the buffer memory location pointed by the AP register. The AP register is automatically incremented to point to the next sequential buffer memory location for the next sequential Rx register to be loaded. This action continues for the number of times specified in COUNT, so that up to six Rx registers may be loaded form the buffer memory.

WRRX: This instruction sequentially writes the contents of the Rx registers into the buffer memory based on the eight-bit integer COUNT. R0 is always the first Rx register written to the buffer memory location pointed by the AP register. The AP register is automatically incremented to point to the next sequential buffer memory location for the next sequential Rx register to be written. This action continues for the number of times specified in COUNT, so that up to six Rx registers may be written into the buffer memory.

SAP MANIPULATION

Some of the following instructions allow the SAP pointers to be loaded from, or written to the R1-R0 register pair. Another instruction allows the SAP pointers to be copied into each other. The final instruction allows an eight-bit integer to be added to either SAP for indexed access to a given entry.

| Format: | OP Code (1 byte) + Operand (1 byte) |
|---|---|
| LDSAP | AP |
| WRSAP | AP |
| MV16 | APa, APb |
| ADAP | AP, DATA |
| | AP, APa, APb are either SAP1 or SAP2 |
| | DATA is an 8-bit integer |

LDSAP: The contents of register R0 will be loaded into the least significant bit of the specified SCSI address pointer. The contents of register R1 will be loaded into the most significant bit of the specified SCSI address pointer.

WRSAP: The LSB of the specified SCSI address pointer will be written into register R0. The MSB of the specified SCSI address pointer will be written into register R1.

MV16: This instruction copies the sixteen-bit address pointer APb into the sixteen-bit address pointer APa ADAP: This instruction adds the eight-bit value of DATA to the sixteen-bit address pointer AP.

REGISTER BANK ACCESS (8-BIT MOVES)

These instructions allow the Rx registers to be transferred within the register bank for the Buffer Access fixed sequence. Another instruction allows the external encoded SCSI ID to be available in the SCSI FIRST BYTE RECEIVED register for later comparisons.

| Format: | OP Code (1 byte) + Operand (1 byte) |
|---|---|
| MV8 | FIRST, Rx |
| MV8 | Rx, FIRST |
| MV8 | FIRST, ID_OFFSET |
| | FIRST is the SCSI FIRST BYTE RECEIVED register |
| | ID_OFFSET is the ID_OFFSET register |
| | Rx is one of R0, R1, R2, R3, R4, or R5 |

MV8: This instruction, in the form (MV a, b), will copy the contents of register b into register a. The legal transfers are shown above.

NUMERIC (8-BIT)FUNCTIONALITY

These instructions provide logical AND, logical OR, incrementing and decrementing capabilities to the SCSI FIRST BYTE RECEIVED register.

| Format: | OP Code (1 byte) + Operand (1 byte) |
|---|---|
| COMPR | OP, Rx |
| OR | DATA |
| AND | DATA |
| INC | FIRST |
| DEC | FIRST |
| | OP specifies a numeric operation, either equal, less than or equal to, greater than or equal to, or zero |
| | Rx is one of R0, R1, R2, R3, R4, or R5 |
| | DATA is an 8-bit integer |
| | FIRST is the SCSI FIRST BYTE RECEIVED register |

COMPR: This instruction compares the SCSI FIRST BYTE RECEIVED register with register Rx as specified in the OP field. It performs the same functions as the existing COMPD instruction.

OR: This instruction performs a logical OR operation between the SCSI FIRST BYTE RECEIVED register and DATA. The result of the operation is stored in the SCSI FIRST BYTE RECEIVED register.

AND: This instruction performs a logical AND operation between the SCSI FIRST BYTE RECEIVED register and DATA. The result of the operation is stored in the SCSI FIRST BYTE RECEIVED register.

INC: This instruction increments the SCSI FIRST BYTE RECEIVED register.

DEC: This instruction decrements the SCSI FIRST BYTE RECEIVED register.

Host Interrupt Capability

The SCSI-protocol processor 21, can generate an interrupt to the local processor on the Host Interrupt (HINT) output signal when the local processors attention is required. This interrupt capability is enabled by setting the Local HINT* Enable (INTERRUPT MODE AND STATUS Register). When an interrupt is generated, the local processor can determine the source of the interrupt by reading the SCSI INTERRUPT WINDOW Register and SCSI INTERRUPT STATUS Register. Also the local processor can obtain the further information by reading the SCSI CONNECTION STATUS Register, the SCSI ERROR STATUS Register, and the SCSI VIEWPORT.

The local processor can also individually steer Buffer Manager interrupt status bits to the HOST INTERRUPT circuit.

SCSI-protocol processor Components

Figure 2:
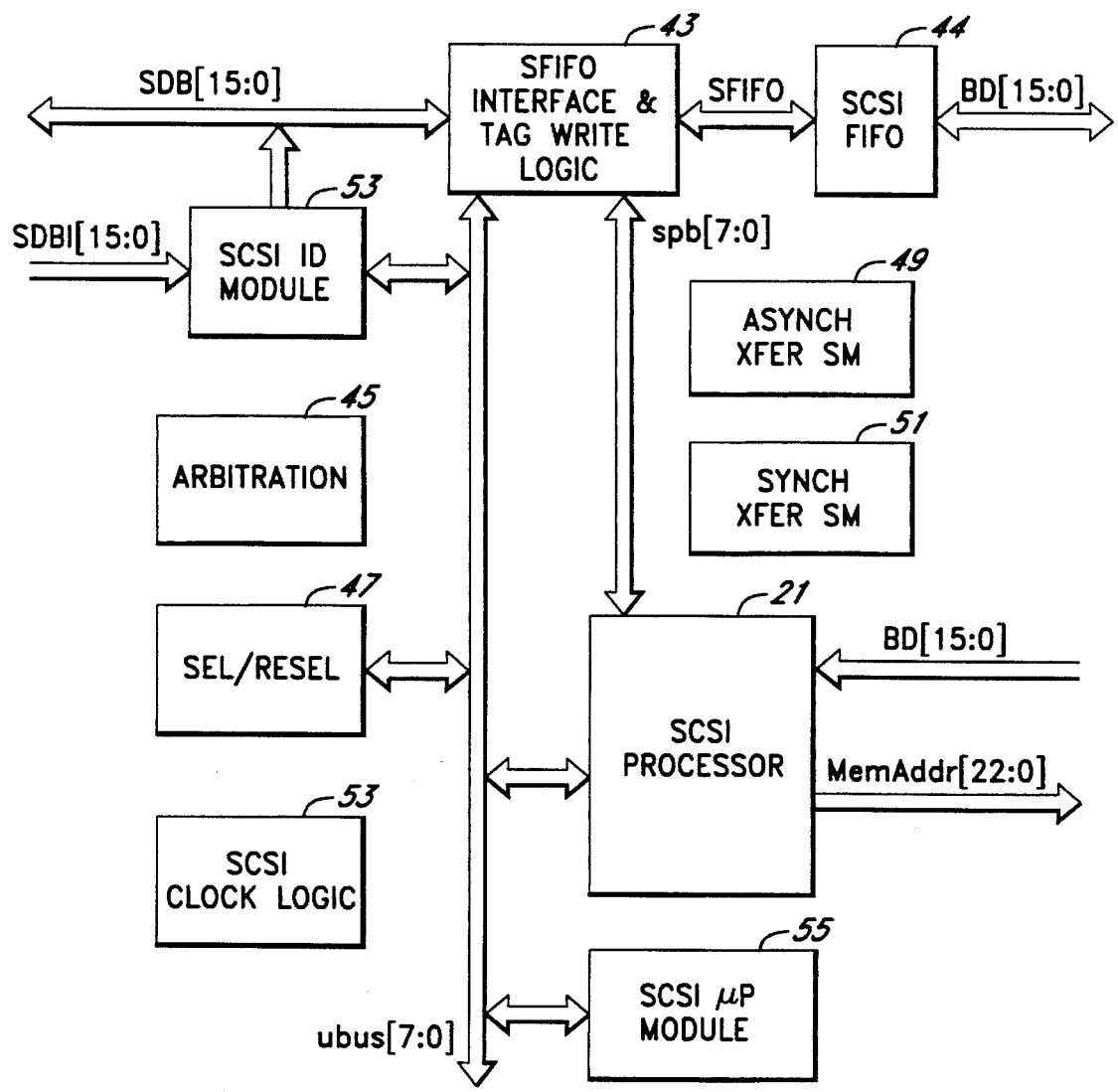
FIG. 2 is a block level diagram of the SCSI-protocol processor interface.

The invented controller's SCSI-protocol processor 21 contains many components. Many of these components are not local processor accessible and their functions are internal to the SCSI processor. This section is devoted to components that are user accessible or whose functions are related to the user interface and will be described with reference to FIG. 2. These components are in addition to SCSI-protocol processor 21, SFIFO Interface and TAG WRITE LOGIC 43, SCSI FIFO 44, Arbitration Module 45, Select/Reselect Module 47, SCSI ID Module 53, Asynch Transfer State Machine 49, Synch Transfer State Machine 51, SCSI Clock Logic 53 and SCSI P Module 55. Only the important data and address buses are shown in FIG. 2. Control signals and clock signals are not shown, but the details of such signals and their generation should be readily apparent from the description provided herein.

A brief description of the buses and signals shown in FIG. 2 is as follows:

| | |
|---|---|
| SDB[15:0]- | a 16 bit databus coupling the SCSI interface to the host for output to the host. |
| SDBI[15:0]- | a 16 bit data bus coupling the SCSI interface to the host for input from the host. |
| SFIFO- | a data bus to the SCSI FIFO. |
| spb[7:0]- | an 8 bit SCSI processor bus. |
| BD[15:0]- | a 16 bit data bus for transferring data from buffer memory to SCSI-protocol processor 21. |
| MemAddr[22:0]- | a 23 bit address bus for addressing buffer memory 27. |
| ubus[7:0]- | an 8 bit bus for passing data between the components of the invented controller and the local processor. |

SCSI CONNECTION ENGINE

A major component of the SCSI-protocol processor 21, is the SCSI Connection Engine which includes the Arbitration, Selection, and Selection/Reselection State Machines. These state machines handle the arbitration, selection, reselection and bus-initiated selection/reselection phases. They are coupled to the SCSI SYSTEM TIME LIMIT Register, FIFO, SAP1, SAP2 and SCSI TRANSFER BYTE COUNTER.

Arbitration: The SCSI Arbitration process can be started by setting the Start Arbitration bit in the SCSI CONNECTION CONTROL Register. After waiting the appropriate bus-free delay, the invented controller ID bit to be driven onto the SCSI bus during the SCSI Arbitration phase is derived from the encoded value in the SCSI CONFIGURATION I Register. (Note, an eight-bit system uses only bits 2:0) If the invented controller loses the arbitration, it will wait for the next bus free phase and will repeat the SCSI arbitration process until it wins the arbitration. When the invented controller wins the arbitration, the SCSI-protocol processor will reset the Start Arbitration bit and set the Arbitration Won bit. The invented controller will perform the appropriate Selection or Reselection process specified in the Active Selection/Reselection Task bits (one of Start Select, Start Select With ATN, or Start Reselect operations).

Selection/Reselection: During the selection/reselection process, the SCSI ID of an initiator (for reselection) or target (for selection) will be driven from the encoded bits 3:0 of the SCSI CONNECTION CONTROL Register. (Note, an eight-bit system only uses bits 2:0) After completion of the selection/reselection process, the SCSI-protocol processor will set the Active Select/Reselect Complete bit. If the Start SCSI processor Program Execution bit is not set, then the SCSI-protocol processor will generate a local processor interrupt. If a SCSI Selection/Reselection Time Out occurs, then the Active Selection/Reselection Timed Out bit will be set, the Start SCSI processor Program Execution bit will be reset, and the invented controller can be programmed to request a local processor interrupt.

Bus-initiated Selection/Reselection: If the Enable SCSI Bus-initiated Selection/ Reselection bit is set, then the SCSI Connection Engine will perform the necessary action to respond to bus-initiated selection and reselection. In the case of bus-initiated selection, the invented controller can be configured as SCSI-1 Mode or SCSI-2 Mode by appropriately setting the SCSI Type Configuration bit. In the SCSI-1 configuration mode, the invented controller will respond to the bus-initiated selection with only its own ID set in the data bus. In this case, the encoded invented controller's SCSI ID will be stored in the FIRST BYTE RECEIVED Register. This also supports the SASI and SCSI-1 single initiator mode. In the SCSI-2 configuration mode, the invented controller will not respond to the bus-initiated selection with only its own SCSI ID bit set.

After the bus-initiated selection or reselection is completed, the appropriate Selected By SCSI Device Without ATN, Selected By SCSI Device With ATN, or Reselected By SCSI Device bit will be set. If the Start Arbitration bit is set, then it will be reset. If the Start SCSI processor Program Execution bit is not set, then the SCSI-protocol processor can be programmed to generate a local processor interrupt. When the bus-initiated Selection/Reselection is completed, the encoded SCSI ID of the requestor is stored in the FIRST BYTE RECEIVED Register. If the requestor's ID is not available (e.g., single initiator mode), then the invented controller's ID will be stored in the FIRST BYTE RECEIVED Register.

Monitoring: The local processor can monitor the current condition of the SCSI bus by reading the SCSI INTERRUPT STATUS, SCSI INTERRUPT WINDOW, SCSI CONNECTION STATUS, SCSI ERROR STATUS and SCSI VIEWPORT Registers. INFORMATION PHASE TRANSITIONS. If the invented controller is in the Target Mode, the SCSI phase can be controlled by the SETP instruction. Also the SCSI control signals such as ACK, REQ, ATN and SRST can be controlled by the SETX instructions. The SCSI bus monitoring can be performed (or used to control SCSI-protocol processor program flow) by using the COMPP (compare the phase) or the COMPX (compare control signals).

INTERRUPT ON SCSI CONNECTION CHANGE

When the controller-initiated or bus-initiated selection/reselection process is completed, and the Start SCSI processor Program Execution bit is set, then the SCSI-protocol processor will not generate a local processor interrupt. Typical usage of this capability is that the local processor can program the SCSI processor to wait until the chip-initiated or bus-initiated selection/reselection is done and to perform the programmed action without requesting a local processor interrupt.

SCSI SELECTION/RESELECTION TIME OUT

When the invented controller is in the SCSI Selection or Reselection phases, the invented controller uses the SCSI System Timer as a Selection/Reselection Timer. During the selection phase, the SCSI System Timer will be reset and will start to count when the invented controller enters the selection phase. If the selected target doesn't assert the BSY signal within the time limit specified in the SCSI SYSTEM TIME LIMIT Register, then the Active Selection/Reselection Timed Out bit will be set and an interrupt issued (if enabled).

During the reselection phases, the SCSI System Timer will be reset and will start counting when the invented controller enters the reselection phase. If the reselected initiator does not assert the BSY signal within the time limit specified in the SCSI SYSTEM TIME LIMIT Register, then the Active Selection/Reselection Timed-Out bit will be set and an interrupt issued (if enabled).

SCSI DISCONNECTION ENGINE

The SCSI Disconnection Engine performs the sequence that is defined by the DISCON2 instruction. That is, change the phase to MSG_IN and wait a minimum of 400 nanoseconds or 800 ns depending on the previous phase. Then send the SAVE DATA POINTER MESSAGE followed by the DISCONNECT MESSAGE.

After sending the DISCONNECT MESSAGE, if the initiator releases ACK without asserting ATN, the SCSI Disconnection Engine will release BSY and disconnect the invented controller from the SCSI bus. The Streaming Initiated Disconnect Completed bit is set and a local processor interrupt will be issued (if enabled). On the other hand, if the initiator asserts ATN before releasing the ACK, then the Streaming Initiated Disconnect Failed bit and the SCSI processor Interrupt bit will be set and an local processor interrupt can be programmed.

SCSI PROCESSOR BASE ADDRESS REGISTER

This register contains the most significant 7 bits of address for SCSI-protocol processor accesses to the buffer. All of the SCSI-protocol processor address resources such as the SCSI PROCESSOR INSTRUCTION ADDRESS REGISTER, SCSI ADDRESS POINTER 1, SCSI ADDRESS POINTER 2, and SCSI RETURN ADDRESS STACK are 16-bit registers. This allows the SCSI-protocol processor to access 64 KB of memory space and the full buffer address will be generated by cascading the SCSI BASE ADDRESS Register with any other SCSI processor Address Pointer.

SCSI INSTRUCTION ADDRESS REGISTER

This register contains the address of the next instruction to execute in the buffer memory. Upon completion of each instruction, this register will be loaded with new address (in case of JUMP, CALL, and RETURN instructions) or increased by 2 or 4 depending on the length of the instruction just executed. Before starting the Program Execution Mode of operation, this register should be set to the proper location (usually the Bus Idle Service Routine) by the local processor.

INSTRUCTION PREFETCH

The SCSI processor's instruction prefetch is composed of an instruction FIFO. The algorithm for the Instruction Prefetch is very simple: Read ahead and hold only consecutive instruction bytes.

SCSI RETURN ADDRESS STACK

The SCSI RETURN ADDRESS STACK holds the return address for the RETURN instruction. Upon executing the CALL instruction, the content of the SCSI PROCESSOR INSTRUCTION ADDRESS Register is pushed into this stack. When executing the RETURN instruction, the top of the stack is popped and copied into the SCSI PROCESSOR INSTRUCTION ADDRESS Register. The SCSI RETURN ADDRESS STACK can hold up to 4 addresses, and the SCSI-protocol processor can execute up to 4 nested subroutine calls. If the SCSI-protocol processor executes the CALL instruction when the SCSI RETURN ADDRESS STACK is full or executes the RETURN instruction when the SCSI RETURN ADDRESS STACK is empty, then the illegal SCSI processor Instruction bit will be set and a local processor interrupt will be generated, the SCSI-protocol processor will be halted, and the Start SCSI processor Program Execution bit will be reset.

SCSI INSTRUCTION REGISTER

This register holds the instruction that is currently executing and is coupled to the SCSI-protocol processor instruction decoder circuitry. During Program execution, this register is loaded from the external buffer memory locations pointed to by the SCSI INSTRUCTION ADDRESS Register (through the SCSI Instruction cache). Before starting an Immediate Execution operation, this register should be set to a valid instruction by the local processor.

SCSI ADDRESS POINTER 1 AND 2

These two registers can be used as a source or destination of the SCSI Transfer when executing the XFER instruction. Prior to executing the XFER instruction, these registers should be set to proper addresses. If one of these register is used as a source or destination of the SCSI Transfer, then the content of the register will be increased by two as one byte of information (and its TAG) is transferred.

SCSI TRANSFER BYTE COUNTER

This 24 bit counter contains the total number of bytes to be transferred and is used during SCSI Data in and Out phases. Prior to starting the SCSI Data Transfer phases, the total number of bytes to be transferred from or to the SCSI data bus must be written to this register. The value read from this counter indicates the number of bytes remaining to be transferred across the SCSI interface at the beginning of the local processor's read cycle.

FIRST BYTE RECEIVED REGISTER

This register holds the first byte received from the SCSI bus when a XFER instruction is executed. The contents of this register will be unchanged until executing another XFER instruction that receives data from the SCSI Bus. When the bus-initiated selection or reselection has been completed, this register contains the encoded SCSI bus ID of the device that selects or reselects the invented controller. When the SCSI TYPE CONFIGURATION bit is set for SCSI-1 mode and the invented controller is selected or reselected with only its own SCSI ID set, the invented controller's encoded ID will be stored in this register.

When executing the COMPD or COMPM instructions, the content of this register is compared with the operand.

EXTERNAL SCSI ID OFFSET REGISTER

When the invented controller is selected or reselected, this four-bit register will be automatically loaded with the requestor's encoded SCSI ID by the SCSI ID module. If the invented controller is selected or reselected with only its own SCSI ID set, then the four-bit Offset Register will be loaded with the invented controller's encoded ID.

When the invented controller wins arbitration and is about to actively select or reselect another device, the four-bit Offset Register will be automatically loaded with the least significant four bits of the SCSI CONNECTION CONTROL Register.

The value in this register is used by the LDAPWO instruction. This instruction is typically used to update the SCSI Transfer Parameter Tables in the buffer memory and to load the SCSI TRANSFER PARAMETER (STP) registers.

SCSI DATA PATH COMPONENTS

The major components of the SCSI-protocol processor are a 64 byte SCSI FIFO 44 and state machines to handle SCSI Asynchronous Transfer and SCSI Synchronous Transfer. These state machines are coupled to the SCSI TRANSFER BYTE COUNTER, the SCSI SYNCHRONOUS TRANS- FER RATE Register, and SCSI SYNCHRONOUS MAXIMUM OFFSET Register.

64 BYTE FIFO

Internal to the invented controller and transparent to the local processor is a 64 byte, bidirectional FIFO 44 used in data reads or writes. Whether transferring eight-bit or sixteen-bit data, the FIFO is effectively 32 words deep. This FIFO acts as a buffer between the SCSI bus and external memory during the DMA process, and it also acts as a temporary storage during the PIO (processor input/output) process. The FIFO is useful for preventing overruns or underruns during the DMA process as its status is used to control the assertion low of the SCSI REQ* signal as a Target or the assertion low of the SCSI ACK* signal as an Initiator.

SCSI Interface Configuration

The invented controller's SCSI interface offers a wide range of flexibility. The invented controller supports the proposed SCSI-2 specification as well as the SCSI-1 specification. The invented controller offers a 16-bit data transfer mode to increase the data transfer rate up to 20 MB/second with the SCSI-2 Fast Synchronous Transfer. Local processor 31 can also configure the system for a combination of up to 16 initiator and target devices by enabling the Wide Arbitration, Selection, and Reselection Mode. In order to support the SCSI-2 Fast Synchronous Transfer, the invented controller's SCSI-protocol processor 21 offers two REQ/ACK de-glitching modes. WIDE SCSI DATA, ARBITRATION, SELECTION, AND RESELECTION The sixteen-bit-wide data transfer mode is enabled by setting the Wide SCSI Enable bit of the SCSI CONFIGURATION 2 Register. If Wide Transfer mode is enabled, the SCSI-protocol processor will automatically transfer sixteen-bit-wide data during DATA In and Out phases but eight-bit-wide data during all other phases. During sixteen-bit wide transfers, the first logical data byte for each data phase shall be transferred across the SDB[7*:0*] signals and the second logical data byte shall be transferred across the SDB[15*:8*] signals.

The sixteen-bit-wide Arbitration, Selection, Reselection, and bus initiated Selection/Reselection mode is enabled by setting the Sixteen-Bit Connection Protocol Enable bit of the SCSI CONFIGURATION 2 Register. In this mode, the invented controller will use 16-bit connection protocols. That is, the invented controller can possibly connect to one of 15 initiator and target devices on the SCSI bus.

When Wide Transfer mode is disabled, the invented controller can use the SDB[15*:8*] and SDBHP* as SCSI Differential Output Enable signals for SDB[7*:0*] and SDBLP* by setting the Eight-bit Differential SDOE Enable bit. If the Eight-bit Differential Sdoe Enable bit is set, then the Wide Transfer Mode bit and Sixteen-bit Connection Protocol Enable bit must be reset.

STREAMING DMA TRANSFER

Prior to starting the DMA transfer, the local processor must write the SCSI TRANSFER BYTE COUNTER Register with the number of bytes to be transferred. During the DMA process, the data to be sent to the SCSI bus comes from the external buffer memory through the FIFO, and the data received from the SCSI bus is stored in the external buffer memory through the FIFO. The DMA process uses the FIFO as a buffer to match the different data transfer rates between the SCSI bus and the external buffer memory. The number of bytes to be transferred is only limited by the size of the SCSI TRANSFER BYTE COUNTER. The DMA process can use Asynchronous or Synchronous Transfer Protocols.

If Disk to SCSI streaming is enabled during the DMA process, then the operation of the DMA process is controlled by the DIFFERENCE COUNTER Register as well as the SCSI TRANSFER BYTE COUNTER. When the DIFFERENCE COUNTER reaches zero, there is no available data to send to the SCSI bus and the SCSI-protocol processor halts the DMA process by freezing the SCSI bus until new data is available from the buffer memory.

If SCSI to Disk streaming is enabled during the DMA process, then the operation of the DMA process is controlled by the DIFFERENCE COUNTER and the MAXIMUM DIFFERENCE THRESHOLD LIMIT Registers as well as the SCSI TRANSFER BYTE COUNTER. When the DIFFERENCE COUNTER reaches the value in the MAXIMUM DIFFERENCE THRESHOLD LIMIT Register (which means the external buffer memory is full), the SCSI-protocol processor freezes the SCSI bus until the external buffer memory has the space to store the data from the SCSI bus.

However, freezing the SCSI bus is not an efficient method for handling the under-run or over-run of the external buffer memory. The invented controller offers a more efficient method for handling these situations. If the Automatic Disconnection mode is enabled, the SCSI-protocol processor will be disconnected from the SCSI bus instead of freezing the SCSI bus. The local processor can resume the operation later by another Selection or Reselection.

SCSI CLOCK SETUP

The invented controller's SCSI interface uses three clocks: the SCSI CLOCK signal, the SCSI processor Clock, and the SCSI Logic Clock. The SCSI handshake logic is driven by the SCSI CLOCK signal. The maximum SCSI CLOCK signal frequency is 40 Mhz. The SCSI processor Clock is derived from the SCSI CLOCK signal. The maximum SCSI processor Clock frequency is 20 Mhz. The SCSI CLOCK signal can be directly passed, or divided by two in order to create the SCSI processor Clock. This is set in the SCSI CONFIGURATION 1 Register.

The SCSI Logic Clock is derived from the SCSI processor Clock. In the preferred embodiment, the SCSI Logic Clock frequency must be between 2.5 and 5 MHz (200–400 nanosecond period range). The local processor must set the SCSI LOGIC CLOCK PRESCALAR in this range for proper operation on the SCSI bus. The SCSI processor Clock is divided by the encoded value in the SCSI LOGIC CLOCK PRESCALAR (SCSI CONFIGURATION 1 Register) to produce the internal SCSI Logic Clock.

Buffer Manager Interface

Buffer manager 15 controls the allocation of external buffer memory 27 between the SCSI data path, the formatter data path, SCSI-protocol processor 21, and the local processor. The buffer manager is responsible for monitoring the SCSI/Disk streaming and controlling the SCSI interface 19 and the disk interface 17 to prevent data underruns and overruns.

The buffer manager interface provides the external RAM addressing, timing, and control signals necessary for the invented controller to interface with buffer memory. The buffer manager interface can also provide for odd parity generation and checking.

Buffer manager 15 can control either Static RAM (SRAM) or Dynamic RAM (DRAM). The invented controller is initialized to the SRAM mode. If DRAM operation is desired then the DRAM/SRAM* bit (BUFFER MANAGER CONFIGURATION 2 Register) should be set. The two modes of operation, however, are sufficiently different that most of the logic is described in two different sections depending on the configuration.

PROTECTED BUFFER AREA

The invented controller can protect a programmable amount of the buffer memory, called the Protected Buffer Area (PBA), from SCSI Host and Disk DMA processes. This area is specified by programming the Protected Buffer Area Floor (PBAF). The PBA includes all buffer memory locations from the value programmed in the PBAF to the end of the buffer memory. This area can be used for general purpose storage, and SCSI processor program storage information.

If a SCSI Host or Disk DMA process reaches the PBAF (such that the HAP or DAP matches the PBAF), the offending process is automatically halted. This is considered to be a programming error. The process can be restarted by writing to the Clear Disk/Buffer Halt Lockout bit (DAP CONTROL Register) or the Clear Host/Buffer Halt Lockout bit (HAP CONTROL Register).

DATA BUFFER RAM PARITY

The invented controller supports data parity on the external data buffer RAM. The buffer manager interface can be configured to provide odd parity for each 8-bit data bus. This(these) parity check bit is(are) written along with the 8-bit (16-bit) data to a 9-bit (18-bit) wide data buffer RAM. The BUFFER MEMORY DATA PARITY signal(s) is(are) connected to the additional RAM device(s). The invented controller provides internal nine-bit data paths and FIFO's for through-parity. If the data source is the SCSI/host interface 19, then the parity generation is dependent on the value of the SCSI BUS Parity Enable bit (of the SCSI MODE CONFIGURATION Register). If this bit is set, then the value of the parity received from the SCSI data bus is passed through to the BUFFER MEMORY DATA PARITY signal. If this bit is reset, then the odd parity value of the data received from the SCSI data bus is generated inside the invented controller and is written out on the appropriate BUFFER MEMORY DATA PARITY signal.

When data is being read from the buffer memory, the odd parity value can be either tested or ignored. If the buffer memory Parity Enable bit of the BUFFER CONFIGURATION Register is set, then the bit value received from the BUFFER MEMORY DATA PARITY signal is tested.

If the Buffer Memory Parity Enable bit of the BUFFER MODE CONTROL Register is reset then the Buffer Parity Error bit is held reset.

RAM READ/WRITE ACCESS CONTROL

Buffer manager 15 accesses the buffer memory data bus to read or to write the contents of the data buffer RAM 27, or to read the static state of the data bus. The direction of the access must be specified in order to generate the correct control signals. SCSI-protocol processor 21, formatter 23, and local processor 31 all use unique methods to specify the direction of the access.

In the case of SCSI transfers, the read/write control is set by the active SCSI-protocol processor command. In the case of formatter transfers, the transfer direction is controlled by the Buffer/Disk Transfer Direction bit (FORMATTER OPERATION CONTROL Register). When this bit is set, the data read from the data buffer RAM is transferred to the Formatter. In order to write to the data buffer RAM from the Formatter this bit must be reset.

In the case of local processor transfers, the local processor control strobe is used in order to determine the transfer direction. A read of the invented controller's BUFFER DATA ACCESS PORT results in a read of the data buffer RAM. A write to the BUFFER DATA ACCESS PORT causes a write to the data buffer RAM.

Given the same direction of data transfer, all read operations are the same regardless of the requesting source. Similarly, all write operations are the same. Both the read and write operation commence when the correct address pointer (such as the Disk Address Pointer, or the Host Address Pointer) is driven onto the buffer memory address bus.

In the case of a read from data buffer RAM 27, the MEMORY OUTPUT ENABLE signal is asserted low after the address is driven onto the address bus. Data must be provided from the RAM shortly before the rising (trailing) edge of the MEMORY OUTPUT ENABLE signal. The duration of the MEMORY OUTPUT ENABLE signal is a programmable parameter. The WRITE ENABLE signal remains inactive throughout the entire RAM read access.

In the case of a write to the data buffer RAM, the WRITE ENABLE signal is asserted low after the address is driven onto the address bus. The WRITE ENABLE signal should be-connected to the RAM write enable or read/write control pin. Data is driven from the invented controller to the data buffer RAM shortly after the address is driven. The WRITE ENABLE signal is de-asserted high near the end of the cycle. The duration of the WRITE ENABLE signal is a programmable parameter. The MEMORY OUTPUT ENABLE signal remains inactive throughout the entire RAM write access.

MEMORY-TO-MEMORY BLOCK OPERATIONS

There are two memory-to-memory block operations: copy, and compare. The buffer memory block operations are executed under the control of Buffer Manager 15. Either the HOST or DISK ADDRESS and LIMIT pointers may be used for the source address. This is selected in the BLOCK OPERATION CONTROL Register. Three address pointers must be initialized before any Buffer Memory Block Operation is started: The HOST or DISK ADDRESS POINTER should be loaded with the starting address of the source data block. The HOST or DISK LIMIT POINTER should be loaded with the ending address of the source data block. The LOCAL ADDRESS POINTER (LAP) should be loaded with the starting address of the destination data block.

Because the LAP registers are utilized during Buffer Memory Block Operations, local processor access to the buffer memory is not allowed until the Buffer Memory Block Operation is complete. If the source ADDRESS and LIMIT POINTERS are the DAP and DLP, then disk operations should not be allowed until the Buffer Memory block operation is complete.

If the source ADDRESS and LIMIT POINTERS are the HAP and HLP, then SCSI data phase access to the buffer memory should not be allowed until the buffer memory block operation is complete.

MEMORY-TO-MEMORY COPY OPERATION

After initializing the address pointers, the buffer memory block copy operation is initiated by setting the Copy Operation Start bit in the BLOCK OPERATION CONTROL Register. At the end of the operation, the Operation Complete bit in the BLOCK OPERATION CONTROL Register will be set to one. These bits can be reset by the local processor by writing a zero to the Copy Operation Start bit after the operation is complete.

MEMORY-TO-MEMORY COMPARE OPERATION

The buffer memory block compare operation is very similar to the block copy operation. The source area is defined by the source address and limit pointers. The destination area start address is defined by the LAP (note that the length is implied from the source length). The operation is initiated by setting the Compare Operation Start bit in the BLOCK OPERATION CONTROL Register. At the end of the operation, the Operation Complete bit in the BLOCK OPERATION CONTROL Register will be set to one. These bits can be reset by the local processor by writing a zero to the Compare Operation Start bit after the operation is complete.

There are three status bits in the BLOCK OPERATION CONTROL Register which indicate the result of the compare operation. These bits are only valid when both the Compare Operation Start and the Operation Complete bits are set. The comparison assumes that bit seven and the byte value at the starting address are the most significant bit and byte (respectively).

The Source Greater Than Destination bit is set to one when the source block (defined by the source pointers) is greater than the destination block.

The Source Less Than Destination bit is set to one when the source block (defined by the source pointers) is less than the destination block.

The Source Equal To Destination bit is set to one when the source block is identical to the destination block.

SCSI/DISK STREAMING OPERATIONS

The invented controller provides circuitry to support two SCSI-to-disk and disk-to-SCSI data streaming methods, with two disk access methods apiece. The invented controller can use a completely programmable portion of the buffer space (up to the full buffer) in limited buffer circular streaming, or perform segment based streaming (which links non-contiguous buffer segments—which is particularly useful in caching).

The Host Interface, the Disk Interface, the SCSI-protocol processor interface, and the Memory Block Access interface all operate in an adaptive or demand mode. The buffer manager transfers up to six bytes (or twelve bytes in a sixteen-bit buffer data path mode) to or from an interface. That is, if the requesting interface has only one byte in the internal FIFO or one byte available then a request is issued to the buffer manager 15. By the time that this request is granted, if additional bytes are available, then these additional bytes will also be transferred to or from the data buffer RAM (up to the burst limit of six or twelve bytes). Requests are granted in an ordered priority with fairness, such that a high priority request can not monopolize the buffer resource.

SFIFO Interface and Tag Write Logic 43 appends a tag byte to each data byte received when processing SCSI-protocol. The tag byte will provide the local processor the ability to determine the corresponding SCSI phase (input/output, command status, message) and the parity status for each byte received from the SCSI bus. This module also includes the data path for data transfer between the SCSI interface and the invention, as well as the data path between the SCSI-protocol processor and the buffer memory.

SCSI micro-processor Module 55 is the block that generates control signals to correctly transfer data between the modules of the SCSI protocol processor, as well as signals for transferring data between the local micro controller and the SCSI input. The SCSI up Module 55 consists of the SCSI Interrupt Status Register, the SCSI Interrupt Enable Register, the SCSI Error Status Register, three SCSI Configuration Registers, and decoder logic in order to correctly generate read, write, and control signals that are output to internal modules and the local micro-controller.

While the preferred embodiment and various alternative embodiments of the present invention has been disclosed and described in detail herein, it will be obvious to those skilled in the art that various changes in form and detail may be made therein without departing from the spirit and scope thereof.

We claim:

1. A controller for providing an interface between a disk drive and a SCSI bus comprising:

SCSI-protocol processor means having an instruction set which provides programmable control for the operation of said interface, wherein instructions are provided to said processor means by a selected one of an external local processor and an external buffer memory, said buffer memory for providing temporary storage for data to be written to said disk drive and for data read from said disk drive and for storing data and instructions for use by said SCSI-protocol processor means, wherein said SCSI-protocol processor means executes a predetermined set of instructions adapted to access said buffer memory utilizing a SCSI Address Pointer;

buffer manager means coupled to said external buffer memory and to said SCSI-protocol processor means for controlling the flow of data to and from said buffer memory and allocating space within said buffer memory for the storage of data and instructions for use by said SCSI-protocol processor means;

arbitration means for requesting exclusive control of a bus coupled to a host computer and repeating the request for exclusive control of the bus until it is made available to the controller;

select/reselect logic means for performing predetermined actions necessary to respond to bus-initiated selection and reselection, wherein for bus-initiated selection, the controller is operable in a selected mode;

asynchronous logic means for performing asynchronous direct memory access data transfers; synchronous logic means for performing synchronous direct memory access data transfers;

SCSI ID module logic means for loading a register with a requestor's encoded SCSI ID when the controller is selected or reselected and if the controller is selected or reselected with only its own SCSI ID set, loading said register with the controller's encoded ID;

SCSI micro-processor module means for generating control signals for transferring data between modules of the SCSI-protocol processor means and control signals for transferring data between a local micro controller and an input to the SCSI-protocol processor means;

interface means for providing an interface for data going to and coming from a SCSI FIFO; and tag write logic means for appending a tag byte to each data byte received when processing SCSI-protocol.

2. A controller for providing an interface between a disk drive and a SCSI bus comprising:

SCSI-protocol processor means for processing instructions for controlling the operation of said interface;

arbitration means for requesting exclusive control of a bus coupled to a host computer and repeating the request for exclusive control of the bus until it is made available to the controller;

select/reselect logic means for performing predetermined actions necessary to respond to bus-initiated selection and reselection, wherein for bus-initiated selection, the controller is operable in a selected one of SCSI-1 mode and SCSI-2 mode;

clock logic means for generating a SCSI clock used to generate a SCSI processor clock;

asynchronous logic means for performing asynchronous direct memory access data transfers;

synchronous logic means for performing synchronous direct memory access data transfers;

SCSI ID module logic means for loading a register with a requestor's encoded SCSI ID when the controller is selected or reselected and if the controller is selected or reselected with only its own SCSI ID set, loading said register with the controller's encoded ID;

SCSI micro-processor module means for generating control signals for transferring data between modules of the SCSI-protocol processor means and control signals for transferring data between a local micro controller and an input to the SCSI-protocol processor means;

interface means for providing an interface for data going to and coming from a SCSI FIFO; and tag write logic means for appending a tag byte to each data byte received when processing SCSI-protocol.

3. The controller defined by claim 2, wherein the SCSI-protocol processor means executes instructions from a selected one of an external local processor and a program stored in buffer memory, said SCSI-protocol processor means having a plurality of instruction execution modes.

4. The controller of claim 3, wherein said plurality of instruction execution modes are immediate execution mode, single step execution mode, and program execution mode.

* * * * *

UNITED STATES PATENT AND TRADEMARK OFFICE
CERTIFICATE OF CORRECTION

PATENT NO. : 5,524,268
DATED : June 4, 1996
INVENTOR(S) : Geldman et al.

It is certified that error appears in the above-indentified patent and that said Letters Patent is hereby corrected as shown below:

In column 1 at line 61, please insert as a new paragraph -- Appendix A, filed herewith and entitled CL-SH4500 Wile E. Coyote Integrated SCSI Disk Controller Engineering Specification, is hereby incorporated by reference. --.

In column 5 at line 67, please delete " process, or " and insert -- processor --.

Signed and Sealed this

Twenty-eighth Day of October, 1997

Attest:

BRUCE LEHMAN

*Attesting Officer*   *Commissioner of Patents and Trademarks*